March 4, 1941.                S. W. WEBSTER                2,233,658
                            OILTIGHT CHAIN GUARD
                            Filed May 6, 1939              3 Sheets-Sheet 1
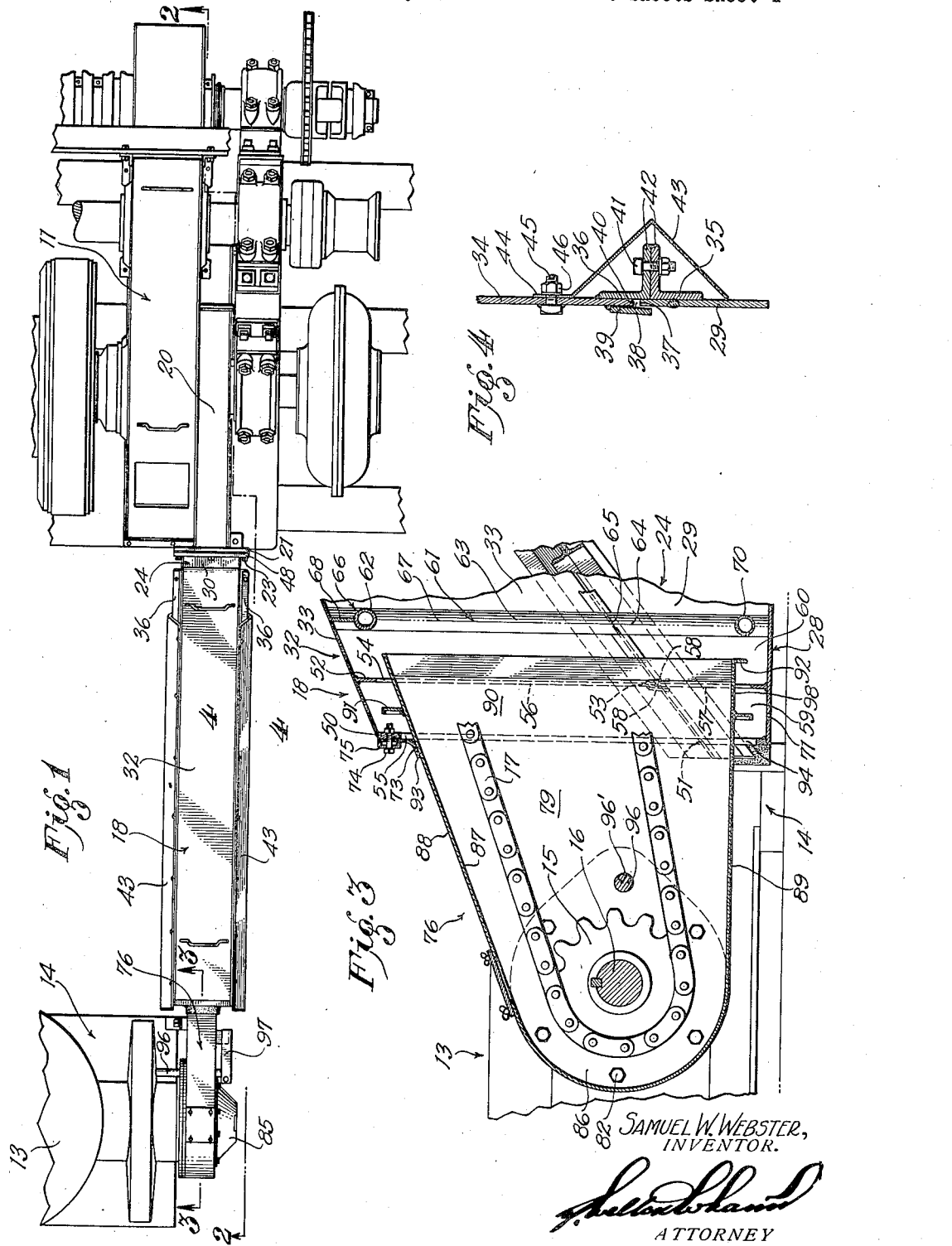
Samuel W. Webster,
INVENTOR.
ATTORNEY

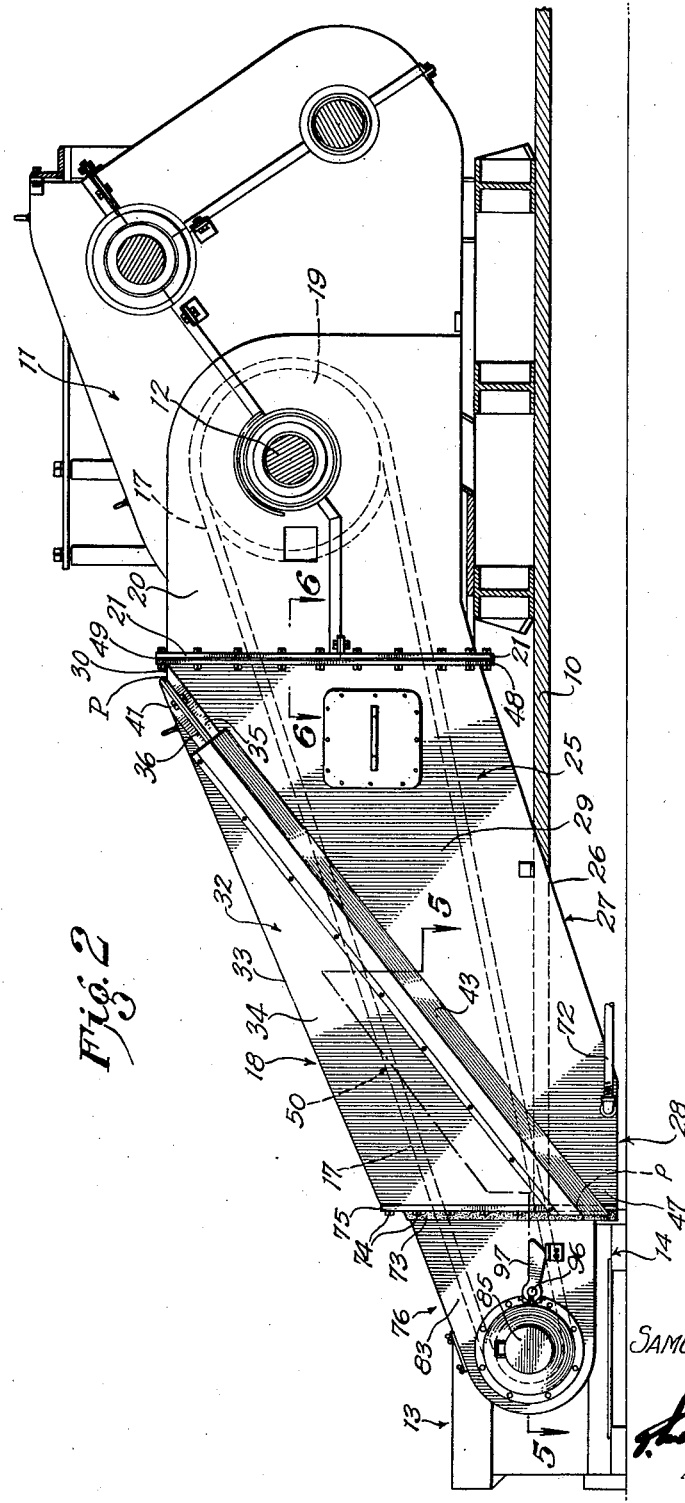

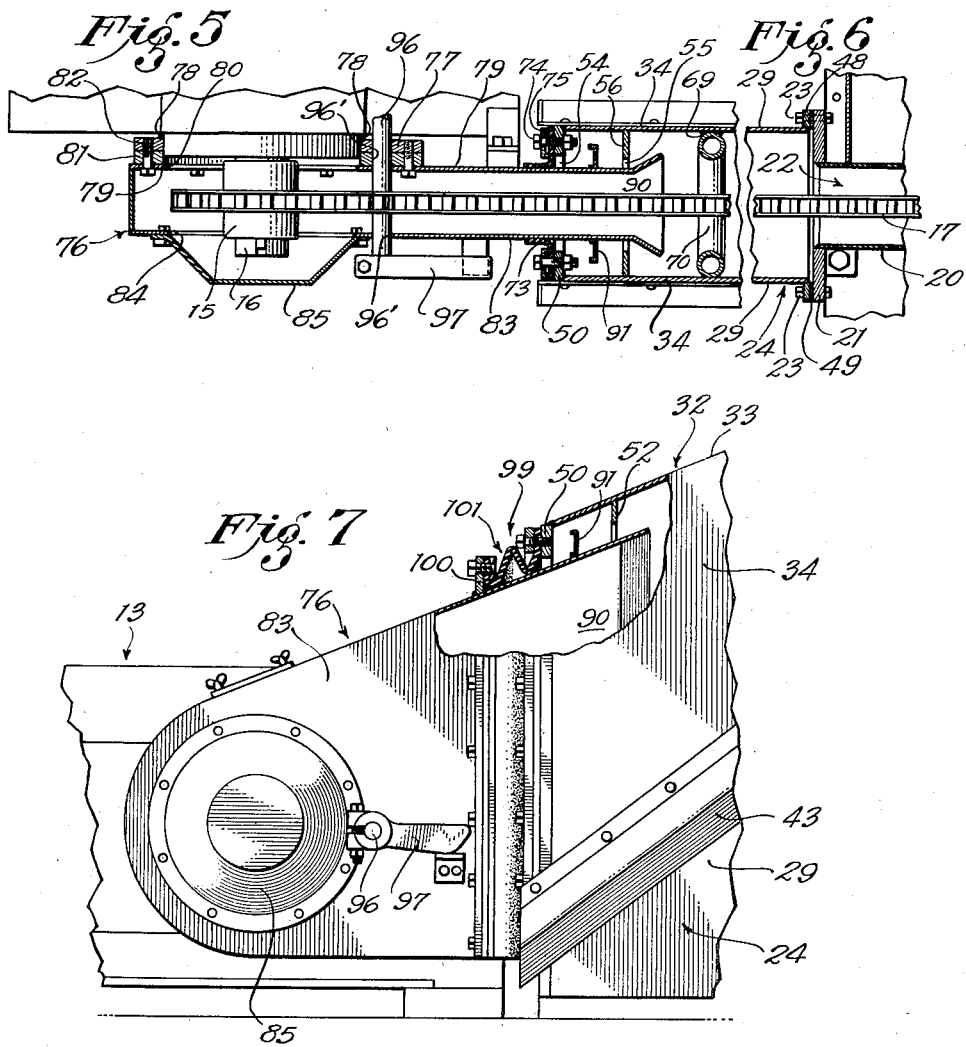

Patented Mar. 4, 1941

2,233,658

UNITED STATES PATENT OFFICE 2,233,658

OILTIGHT CHAIN GUARD

Samuel W. Webster, Houston, Tex., assignor to Emsco Derrick & Equipment Company, Los Angeles, Calif., a corporation of California Application May 6, 1939, Serial No. 272,255

16 Claims. (Cl. 74—611)

My invention relates to guards of the type employed for chain drives, and relates in particular to a guard of this type especially suited for use under conditions where there is relative movement between the drive and driven members. The present extensive use to which the invention is put is as a guard for chain drives for rotary well drilling equipment wherein the rotary table is driven through a heavy chain from the sprocket provided for this purpose on the drawworks. In the operation of this rotary drilling equipment, especially in deep well drilling, there is movement of the rotary machine relative to the drawworks occasioned by the constantly changing heavy stresses applied to the floor and other parts of the derrick. For example, when the load of a string or drill pipe is taken on the rotary table, the rotary machine may be caused to move downward relative to the drawworks due to deformation of the floor beams or supports as the result of the load applied.

It is an object of the present invention to provide a guard for a power drive of this type and which is extended between drive and driven members which have relative movement, the guard though simple in form permitting such relative movement, and at the same time fully protecting the drive.

Chain drives, especially those used to transmit heavy loads, require constant lubrication. It is an object of my invention to provide a guard of a character to enable constant lubrication by an ample flow of lubricant and which will protect the lubricant from contamination by foreign materials. The guard provided by my present invention keeps the lubricant free from substances such as dirt and grit, which cause rapid wear of the chain or other drive parts which are subjected to heavy stresses while in the service.

Drives of this type are often used in environments where injurious and oil contaminating materials are present. For example, more or less drilling mud and dirt accumulates in and around oil drilling derricks, and it is a customary practice to periodically wash down the equipment with a high pressure stream of water.

It is an object of the invention to provide a guard having a joint which will permit relative movement of the drive and driven members but which is so formed that mud and water from the exterior will not enter the oil chamber of the guard or come into contact with the drive means.

It is an object of the invention to provide a guard having at least a pair of cooperating sections connected by a joint permitting movement thereof, and having an intermediate chamber associated with this joint and being disposed between the exterior of the guard and the interior chamber of the guard to catch and divert to a desired point of disposal any leakages to and from the exterior of the guard or the interior chamber of the guard.

It is a further object of the invention to provide a guard having a breather opening so placed it will have communication with the intermediate or catch chamber. This permits air to pass in and out of the guard in accordance with pressure changes, but traps any contaminating fluids or solids tending to enter the guard.

A further object of the invention is to provide a guard having a removable cover with side walls so formed that when the cover is removed, the chain or other drive means will be exposed in a manner to give ready access to knock-out pins for connecting cooperating parts of the drive.

A further object of the invention is to provide a cover so formed that its removal will not disturb the fixed joint by which one of the guard sections is permanently connected to one of the mechanisms between which the guard structure is extended.

A further object of the invention is to provide a guard section having a cover and a base joint along a line extended from the top of the guard section to a point at an end of the guard section, such point being disposed at such distance below the top of the guard that when the cover is removed a side portion of the drive will be exposed. Where the guard is used for a chain drive, this cooperation of a base and cover in one of the guard sections makes it possible by removal of the cover to expose part of the chain so that the chain may be connected or disconnected.

It is a further object of the invention to provide a guard having a first section with an opening and a second section with a portion projecting into the opening, there being cooperating baffles on the overlapping portions of the two sections. A feature of the invention is to provide the first of the sections with a cover, removal of which will permit ready disengagement of the section by merely lifting the second section out of the front end of the first section.

It is a further object of the invention to provide a guard of the above character having first and second sections in confronting relation, the first of these sections having a wall spaced from its end so as to provide a catch chamber or basin and the second section having an apron projecting into the first section to a point beyond the wall so that lubricant which drops from the chain or other drive within the guard will be kept from the catch chamber.

Further objects and advantages of the invention will be brought out in the following part of the specification.

Referring to the drawings which are for illustrative purposes only:

Fig. 1 is a plan view of a preferred form of my invention adapted for use with a chain drive for a rotary machine.

Fig. 2 is a sectional view taken as indicated by the line 2—2 of Fig. 1.

Fig. 3 is an enlarged fragmentary section taken as indicated by the line 3—3 of Fig. 1.

Fig. 4 is an enlarged fragmentary section taken as indicated by the line 4—4 of Fig. 1.

Fig. 5 is an enlarged fragmentary section taken as indicated by the line 5—5 of Fig. 2.

Fig. 6 is an enlarged fragmentary section taken as indicated by the line 6—6 of Fig. 2.

Fig. 7 is a partly sectioned fragmentary view showing an alternative joint which may be used between the relatively movable guard sections.

Fig. 2 shows a derrick floor 10 which supports a drawworks 11, having a drive shaft 12 from which a rotary machine 13 is driven. In the arrangement shown in Fig. 1, the base 14 of the rotary machine is dropped below the floor 10. As shown in Fig. 3, the rotary machine 13 has a driven sprocket 15 mounted on a shaft 16. The sprocket 15 is rotated by a chain 17 which extends rightward from the sprocket 15 through a chain guard 18 to a sprocket mounted on the drive shaft 12 of the drawworks 11, this latter sprocket being disposed as shown by dotted lines 19 within a housing or guard 20 forming a permanent part of the drawworks 11. The housing 20 has a flange 21 defining an opening 22 through which the chain 17 extends. By use of bolts 23, a guard section 24 is secured to the housing 20 of the drawworks 11. Insofar as the present invention is concerned, the housing 20 may be considered a part of or an extension of the lower portion or base 25 of the guard section 24. What is meant by this is that the lower portion 25 of the guard section 24 could be continued through the position occupied by the housing 20, surrounding the drive sprocket 19, but it is preferred to employ a plane of detachment at the flange 21 for the reason that it is at times desirable to remove the guard 18, as, for example, when the rotary machine 13 is not in use.

The base 25 of the guard section 24 has a lower wall 26, which, in the design of the device disclosed, has a downward sloping portion 27 and a substantially horizontal portion 28. The base 25 has side walls 29 projecting upward from the bottom wall 26. The base 25 is also shown with a very narrow top wall 30, lying, as shown in Fig. 2, at the rightward end of a cover 32 which forms the upper part of the guard section and which has a top wall 33, side walls 34, the top wall 33 being preferably substantially parallel to the sloping portion 27 of the bottom 26 of the base 25. The cooperating side walls 29 and 34 of the base 25 and the cover 32 meet along a diagonal line defined by angles 35 and 36 which are secured respectively to the side walls 29 and 34. As shown in Fig. 4, each angle 35 may be welded to a side wall 29 in a position spaced slightly below the upper edge 37 of a side wall 29 so that such upper edge 37 will provide a flange or rib to project into a channel 38 formed by welding a metal strip 39 to the cooperating side wall 34 of the cover 32 in a position to project below the lower edge 40 of the side wall 34. The cover 32 is secured on the base 25 by use of bolts 41 which are passed through the outstanding legs 42 of the angles 35 and 36. To protect the joint thus formed between the base 25 and the cover 32, cover plates 43 of channel form are provided to overlie the cooperating pairs of angles 35 and 36, as shown in Fig. 4, each of these cover plates 43 having an upwardly extending flange or lip 44 through which studs 45 may project to receive nuts 46 for holding the cover plates 43 in place.

The line of separation between the base 25 and the cover 32, defined by the meeting faces of the angles 35 and 36, extends from a point P at the top of the base 25 to a point p at the extended end 47 of the section 24 and below the top wall 33 of the cover 32 and therefore of the section 24. The base 25 is shown with a flange 48 to cooperate with a flange 21 of the housing 20, and to provide a tight seal for the joint between the flanges 21 and 48, a gasket 49 may be employed. The cover 32 of the section 24 may be removed from the base 25 without disturbing the joint formed by the flanges 21 and 48 for the reason that the rightward end of the cover 32 does not extend to the joint but is separated therefrom by the narrow top wall 30 of the base 25. The side walls 34 of the cover 32 are of such size that when the cover 32 is removed a sufficiently large portion 50 of the chain 17 will be exposed, and the sides of the exposed portion of the chain will be readily accessible so that knock-out pins may be removed to sever the chain, or during installation ample room is provided in which the workmen may connect the chain ends together so as to form a continuous loop thereof.

The guard section 24 has an inwardly projecting flange 50 at its forward end, a part of this flange being carried by the base 25 and a part being carried by the cover 32, the upper and lower portions of the flange being at a plane of separation, as indicated at 51 in Fig. 3. Spaced from the flange 50 there is a baffle or inwardly projecting wall 52 comprising strips secured to the bottom, side and top walls of the guard section 24 so as to form a substantially rectangular frame divided into upper and lower sections at 53, Fig. 3, this baffle having a rectangular opening 54 which is nearly the same size as the opening 55 defined by the flange 50. At the points of joinder of the upper and lower parts 56 and 57 of the baffle 52, small plates 58 may be welded in downwardly projecting relation so as to cover the joints between the side portions of the upper and lower baffle sections 56 and 57. The flange 50 and the baffle 52 define an intermediate or catch chamber 59, positioned so as to lie between the opening 55 and the interior space or oil chamber 60 of the guard section 24.

A guard 61 is secured to the interior of the guard section 24 in a position adjacent to the baffle 52 to protect the same from the chain 17. This guard 61 consists preferably of a rectangular frame made of pipe 62 and having upper and lower sections 63 and 64 which meet on the plane of division between the base 25 and the cover 32, as indicated at 65. The top section 70 66 of the pipe 62 is connected to the top wall 33 by means of a plate 68 and the side portions 67 of the pipe 62 are connected directly to the side walls 29 and 34 by welds 69, but the lower member 70 of the pipe 62 is spaced from the bottom wall portion 28 so that oil may flow thereunder. The catch chamber 59 has a drain opening 71, and an oil transfer conduit 72 is connected into the lower portion of the oil chamber 60 of the section 24 through which the lubricant which drops from the chain 17 may be carried to a circulating pump, not shown, which will return it continuously to the chain so that a constant and ample lubrication of the chain is accomplished.

Yieldable sealing means for a selected part of the opening 55, shown in the form of a flexible wall 73, such as rubber, is secured to the flange 50 by means of bolts 74 and a cover strip 75. The chain guard 18 includes a second guard section 76 which is secured to the rotary machine 13 in a position to enclose the chain 17 and project toward the guard section 24. As best shown in Fig. 5, a mounting ring 77 is secured to the base of the rotary machine 13, as by use of welds 78. The guard section 76 has a back wall 79 provided with an opening 80 surrounded by a ring 81 which is secured to the ring 77 by means of screws 82. The section 76 has a front wall 83 of essentially the same outline as the back wall 79 and having an opening 84 normally closed by a removable cover 85. As shown in Fig. 3, the ends 86 of the walls 79 and 83 are rounded and a metal sheet 87 is bent so as to extend between the upper, lower, and curved end edges of the walls 79 and 83, and is secured to such edges so as to form a top wall 88 and a bottom wall 89 for the section 76, the top wall 88 having a slope agreeing in inclination with the slope of the top wall 33.

The section 76 communicates with the opening 55 at the projecting end of the section 24 and a portion of the section 76 preferably extends into the section 24 to a point beyond the baffle 52 so that the end portion 90 of the section 76 will pass across the catch chamber 59. A baffle 91 is secured peripherally to the end portion 90 of the section 76 in such position that it will extend outward from the walls 79, 83, 88, and 89 into the space between the flange 50 and the baffle 52, the periphery of this baffle 91 defining an area larger than the area of the opening 55, so that any substance passing through the opening 55 will be deflected outward into the catch chamber 59. This baffle 91 obstructs the direct line of passage from the opening 55 of the flange 50 to the opening 54 of the baffle 52. The extremity of the bottom wall 89 may be provided with a down turned lip 92.

The sealing means 73 is so formed that the lip 93 thereof will be deflected outward and lie against a portion of the surface of the section 76. In the preferred practice of the invention this sealing means extends across the top and down the sides of the opening 55, the lower transverse portion 94 of the opening 55 being left unobstructed so as to provide a breather space communicating with the interior of the guard section 24. It will be perceived that this lower portion 94 of the opening 55 is ordinarily in a position below the floor 10 of the derrick and is therefore not exposed to conditions which might result in the entry of mud or water into the catch chamber 59.

The area of the opening 55 is larger than the cross sectional area of that portion of the section 76 which passes therethrough so that there may be a fairly great relative movement between the sections 76 and 24 without engagement of the section 76 with an edge of the flange 50. During this relative movement the rubber sealing means 93 will yield in accordance with the requirements of the relative movement.

Rotary machines of the type with which the invention may be employed ordinarily have locking means for the shaft 16 and for control of this locking means there may be an extended shaft 96 with an external operating lever 97. Openings 96' may be formed in the rings 77 and 81 and in the front wall 83 of the section 76 through which the shaft 96 may pass.

During the operation of the drive, oil may drip from the chain 17. That oil which drips within the section 76 will pass to the bottom wall 89 thereof and will be conducted across the catch chamber 59 by the apron 98 formed by the rightward portion of the bottom wall 89 into that portion of the interior chamber 60 of the section 24 lying between the baffle 52 and the guard 61, and will therefore be combined with the oil which drips from the chain 17 within the interior chamber 60 of the section 24. The end portion 90 of the section 76 also intercepts oil which is splashed outward from the chain 17 toward the catch chamber 59 so that such oil is ultimately carried into the chamber 60.

When it is desired to disconnect the chain 17 and to remove the rotary machine 13 from its operating position, the side cover plates 43 may be removed so as to expose the bolts 41. After removal of these bolts 41, the cover 32 may be lifted vertically from the operating position thereof, shown in Fig. 2, the side portions of the flange 50 and of the baffle 52 passing upwardly along the side portions of the baffle 91. This exposes nearly all of the end portion 90 of the section 76 and a portion of the upper run of the chain 17, so that the chain may be readily disconnected by removal of a pin thereof. The rotary machine 13 may then be lifted vertically from its position in Fig. 2, thereby removing the section 76 from its overlapping relation to the end portion of the base 25, without disturbance of the base 25 and without necessity of disconnecting the base 25 from the housing 20 of the drawworks 11. A reversal of the foregoing acts will result in placement of the rotary machine 13 and installation of the cover 32 without need for moving the base 25.

In Fig. 7 I show an alternative form of joint 99 to connect the guard sections 24 and 76 together for limited relative movement. A flange 100 is secured peripherally to the section 76 in spaced relation to the flange 50 so as to support the outer end of a flexible bellows 101 which has its inner end secured to the flange 50. This bellows seal 101 is ordinarily extended only across the top and sides of the section 76, but if desired may be carried entirely around that portion 76 lying between the flanges 50 and 100 if desired.

I claim as my invention:

1. In a guard of the character described for use with a drive between mechanisms which may be relatively movable during operation, the combination of: a pair of guard sections supported in adjacent relation, the first of said sections having an oil chamber formed therein and an opening confronting the second of said sections, and said second section having an extension projecting into said first section to communicate with said oil chamber, there being a catch chamber in said first section between said oil chamber and said opening to receive leakage from said opening or said oil chamber.

2. In a guard of the character described for use with a drive between mechanisms which may be relatively movable during operation, the combination of: a pair of guard sections supported in adjacent relation, the first of said sections having an oil chamber formed therein and an opening confronting the second of said sections, and said second section having an extension projecting into said first section to communicate with said oil chamber, there being a catch chamber in said first section between said oil chamber and said opening to receive leakage from said opening or said oil chamber; and sealing means between said sections to guard at least a portion of said opening.

3. In a guard of the character described for use with a drive between mechanisms which may be relatively movable during operation, the combination of: a pair of guard sections supported in adjacent relation, the first of said sections having an oil chamber formed therein and an opening confronting the second of said sections, and said second section having an extension projecting into said first section to communicate with said oil chamber and being so formed as to have relative movement in said opening in a plane lying in crossing relation to a common centerline extending through said sections, there being a catch chamber in said first section between said oil chamber and said opening to receive leakage from said opening or said oil chamber; and sealing means disposed between at least the tops and sides of said sections, said sealing means being yieldable so as to permit relative movement of said sections in said plane.

4. In a guard of the character described for use with a drive between mechanisms which may be relatively movable during operation, the combination of: a pair of guard sections supported in adjacent relation, the first of said sections having an oil chamber formed therein and an opening at its front end confronting the second of said sections, and said second section having an extension projecting into said first section to communicate with said oil chamber, there being a catch chamber in said first section between said oil chamber and said opening to receive leakage from said opening or said oil chamber, said first section comprising a base and a cover, said cover and said base being cooperatively formed so that a line of separation between them will extend from a point at the front end and below the top of said first section to a point at the top of said first section spaced from said front end thereof.

5. In a guard of the character described for use with a drive between mechanisms which may be relatively movable during operation, the combination of: a pair of guard sections supported in adjacent relation, the first of said sections having an oil chamber formed therein and an opening at its front end confronting the second of said sections, and said second section having an extension projecting into said first section to communicate with said oil chamber, there being a catch chamber in said first section between said oil chamber and said opening to receive leakage from said opening or said oil chamber, said first section comprising a base and a cover, said cover and said base being cooperatively formed so that a line of separation between them will extend from a point at the front end and below the top of said first section to a point at the top of said first section spaced from said front end thereof; and sealing means disposed between at least the tops and sides of said sections, said sealing means being yieldable so as to permit relative movement of said sections.

6. In a guard of the character described for use with a drive between mechanisms which may be relatively movable during operation, the combination of: a pair of guard sections supported in adjacent relation, the first of said sections having an oil chamber formed therein and an opening at its front end confronting the second of said sections, and said second section having an extension projecting into said first section to communicate with said oil chamber, there being a catch chamber in said first section between said oil chamber and said opening to receive leakage from said opening or said oil chamber, said first section comprising a base and a cover, said cover and said base being cooperatively formed so that a line of separation between them will extend diagonally from a point at the front end and below the top of said first section to a point at the top of said first section spaced from said front end thereof, so that removal of said cover will expose a side portion of the drive which the guard covers.

7. In a guard of the character described for use with a drive between mechanisms which may be relatively movable during operation, the combination of: a first guard section secured to one of said mechanisms and having an opening at its extended end, said section comprising a base and a cover separable on a line which extends from a point at said extended end and below the top of said section to a point at the top of said section spaced from said extended end; and a second section connected to the second of said mechanisms and projecting into said opening, there being sealing means between said sections of a character to permit relative movement of said sections.

8. In a guard of the character described for use with a drive between mechanisms which may be relatively movable during operation, the combination of: a first guard section secured to one of said mechanisms and having an opening at its extended end, said section comprising a base and a cover separable on a line which extends diagonally from a point at said extended end and below the top of said section to a point at the top of said section spaced from said extended end, there being a wall forming a catch chamber within said section; and a second section connected to the second of said mechanisms and projecting into said opening to a point beyond said wall, there being sealing means between said sections of a character to permit relative movement of said sections.

9. In a guard of the character described for use with a drive between mechanisms which may be relatively movable during operation, the combination of: a first guard section secured rigidly to one of said mechanisms and having an opening at its extended end, said section comprising a base and a cover separable on a line which extends diagonally from a point at said extended end and below the top of said section to a point at the top of said section spaced from said extended end, there being a wall forming a catch chamber within said section; a second section rigidly secured to the other of said mechanisms and confronting said opening of said first section; sealing means between said sections to guard a selected portion of said opening; and an apron projecting from said second section into said opening to a point beyond said wall.

10. In a guard of the character described for use with a drive between mechanisms which may be relatively movable during operation, the combination of: a first guard section secured to one of said mechanisms and having an opening at its extended end, there being a wall forming a catch chamber within said section; and a second section connected to the second of said mechanisms so as to move substantially bodily therewith and projecting into said opening to a point beyond said wall, there being sealing means between said sections of a character to permit relative movement of said sections.

11. In a guard of the character described for use with a drive between mechanisms which may be relatively movable during operation, the combination of: a first guard section extending from one of said mechanisms in a fixed position of operation and having an opening at its extended end, there being a wall forming a catch chamber within said section; a second section connected to the other of said mechanisms so as to move bodily therewith and having an opening confronting said opening of said first section; sealing means between said sections, said sealing means permitting relative movement of said sections; and an apron projecting from said second section into said opening to a point beyond said wall.

12. In a guard for a rotary chain drive extended from a drawworks to a rotary machine, the combination of: a first guard section secured to said drawworks in extending position so as to cover a portion of the rotary drive, there being an opening at the outer end of said section, an inwardly projecting flange around said opening, and a baffle spaced from said flange so as to define a catch chamber adjacent said opening; a second guard section secured to said rotary machine, said second section having a portion projecting through said opening to a point beyond said baffle in said first section, and said second section having a baffle thereon in a position between said flange and said baffle of said first section; and sealing means at said opening of a character to permit relative movement of said sections.

13. In a guard for a rotary chain drive extended from a drawworks to a rotary machine, the combination of: a first guard section secured to said drawworks in extending position so as to cover a portion of the rotary drive, there being an opening at the outer end of said section, an inwardly projecting flange around said opening, and a baffle spaced from said flange so as to define a catch chamber adjacent said opening; a guard within said first section, adjacent said baffle of said first section, to protect the same from said chain; a second guard section secured to said rotary machine, said second section having a portion projecting through said opening to a point beyond said baffle in said first section, and said second section having a baffle thereon in a position between said flange and said baffle of said first section; and sealing means at said opening of a character to permit relative movement of said sections.

14. In a guard for a rotary chain drive extended from a drawworks to a rotary machine, the combination of: a first guard section secured to said drawworks in extending position so as to cover a portion of the rotary drive, there being an opening at the outer end of said section, an inwardly projecting flange around said opening, and a baffle spaced from said flange so as to define a catch chamber adjacent said opening, and said section comprising a base and a cover separable along a line which is at the front end of said section below a part of said chain drive so that a side of said chain drive will be exposed; a second guard section secured to said rotary machine, said second section having a portion projecting through said opening to a point beyond said baffle in said first section, and said second section having a baffle thereon in a position between said flange and said baffle of said first section; and sealing means at said opening of a character to permit relative movement of said sections.

15. In a guard of the character described for use with a drive between mechanisms, the combination of: a first guard section operatively associated with one of said mechanisms, said guard section having an outwardly faced opening therein; a second guard section operatively associated with the other of said mechanisms in confronting relation to said opening of said first guard section, said second section having a portion which extends into said first section through said opening, said portion being smaller than said opening so as to have movement relative to said first section in a transverse plane; and sealing means for said opening operative between said first section and said second section and being organized so as to permit relative movement of said sections in said transverse plane.

16. In a guard of the character described for use with a drive between mechanisms, the combination of: a first guard section operatively associated with one of said mechanisms, said guard section having an outwardly faced opening therein; a second guard section operatively associated with the other of said mechanisms in confronting relation to said opening of said first guard section, said second section having a portion which extends into said first section through said opening, said portion being smaller than said opening so as to have movement relative to said first section in a transverse plane; and baffle means extending respectively inwardly and outwardly from said first and second sections in intermeshing relation so as to obstruct the space existing externally of said second section within the opening of said first section and permit lateral relative movement of said first and second sections.

SAMUEL W. WEBSTER.